United States Patent [19]

Schmidt et al.

[11] 4,017,558

[45] Apr. 12, 1977

[54] THERMOPLASTIC MOLDING COMPOSITIONS OF HIGH IMPACT RESISTANCE

[75] Inventors: Franz Schmidt, Mannheim; Gerhard Fahrbach, Plankstadt; Wolfgang Schenk, Schwetzingen; Erhard Seiler, Freiburg, all of Germany

[73] Assignee: BASF Aktiengesellschaft, Ludwigshafen, Germany

[22] Filed: Feb. 13, 1975

[21] Appl. No.: 549,678

[30] Foreign Application Priority Data

Feb. 22, 1974 Germany ............................ 2408487

[52] U.S. Cl. ............................ 260/876 B; 260/879; 260/880 B; 260/887; 260/892

[51] Int. Cl.² .......................................... C08L 53/00

[58] Field of Search ............... 260/887, 876 B, 892, 260/879, 880 B

[56] References Cited

UNITED STATES PATENTS

| 3,398,074 | 8/1968 | Eguchi et al. | 260/887 |
| 3,732,333 | 5/1973 | Mantell | 260/874 |

*Primary Examiner*—J. Ziegler
*Attorney, Agent, or Firm*—Johnston, Keil, Thompson & Shurtleff

[57] ABSTRACT

Impact-resistant thermoplastic molding compositions containing from 70 to 98 percent by weight of a polyoxymethylene and from 30 to 2 percent by weight of a block copolymer of the general formula A — B — A, wherein A is a polyalkylene oxide block and B is a diene polymer block.

2 Claims, No Drawings

THERMOPLASTIC MOLDING COMPOSITIONS OF HIGH IMPACT RESISTANCE

This application discloses and claims subject matter described in German Pat. No. P 24 08 487.5, filed Feb. 22, 1974, which is incorporated herein by reference.

The present invention relates to thermoplastic molding compositions of high impact resistance and based on polyoxymethylene and block copolymers of a diene polymer block B and polyalkylene oxide blocks A of the general formula

A — B — A.

Polyoxymethylenes are prepared by polymerization of formaldehyde or trioxane or by copolymerization of these monomers with suitable oxacyclic compounds or with polyformals. They are partially crystalline plastics having high rigidity and tensile strength. However, articles molded from polyoxymethylene exhibit a relatively low impact resistance, and this is an obstacle to the use of said plastics for various applications.

The impact resistance of polyoxymethylene is increased slightly by the addition of polyhydric alcohols such as glycerol or timethylolpropane or by the addition of low-boiling substances such as trioxane and 1,4-dioxane, but this is accompanied by a sharp drop in rigidity and tensile strength. The same applies, basically, to the addition of carboxamides. These additives suffer from the additional disadvantage that they can be washed out of the composition or exude from the shaped articles. It has also been proposed to prepare thermoplastic molding compositions by blending polyoxymethylene with high molecular weight polyurethanes of polyhydroxy compounds having molecular weights of from 500 to 4,000, polyisocyanates and chain lengtheners. However, these molding compositions also show a marked reduction in rigidity and tensile strength. Furthermore, the stability of the products is impaired, particularly as regards discoloration due to thermal stresses and light. Belgian Pat. No. 703,125 recommends the addition of butadiene/acrylonitrile copolymers or polyacrylates. However, these additives lower the thermal stability of the molding compositions and cause strong discoloration during processing.

We have now found that thermoplastic molding compositions showing greatly improved impact resistance may be obtained by blending polyoxymethylenes, particularly trioxane copolymers, which contain oxyalkylene groups containing at least 2 adjacent carbon atoms, with block copolymers of diene polymers and polyethylene oxide of the A—B—A type. This discovery was particularly surprising, since polyethylene oxide is not very compatible with polyoxymethylenes. The molding compositions of the invention show only a slight tendency to discoloration during processing. Thermal stability remains almost unchanged on the addition of the block copolymers, whilst stiffness and tensile strength diminish only slightly. Furthermore, the hydrophilic polyethylene oxide segments prevent static electrification of the molding compositions of the invention. Since the antistatic agent is present as an integral part of the polymer, elutriation or exudation thereof from the molding composition is impossible. A distinct improvement in the impact resistance is obtained, surprisingly, with even relatively low additions of block copolymer. In general, from 2 to 30 percent and preferably from 5 to 15 percent of rubber component, by weight of the total mixture, is used.

The polyoxymethylene components used in the manufacture of the molding compositions of the invention may be homopolymers of formaldehyde or of trioxane in which the terminal groups have been etherified or esterified to protect them from degradation commencing at the chain ends. However, it is preferred to use copolymers of formaldehyde or of trioxane which contain in the chain, in addition to oxymethylene groups, up to 30 percent by weight, e.g. from 0.1 to 25 percent by weight, of oxyalkylene groups, for example the oxyethylene, oxybutylene or oxypropylene group. Particularly suitable are copolymers of trioxane with ethylene oxide, 1,3-dioxolane, 1,3-dioxepan, 1,3,6-trioxocane or polyformals. The melt indices of the polyoxymethylenes used are from 1 to 30 and preferably from 2 to 20, as determined according to ASTM 1238-52 T. In the high molecular range, the use of branched trioxane terpolymers is to be recommended on account of their better processability. The melting points of the polyoxymethylenes used according to the invention are generally about 130° C and preferably above 150° C.

The block copolymers A—B—A and processes for their preparation are described in detail in German Pat. No. 2,230,227.

The diene polymer B may be: a homopolymer of a diene hydrocarbon or a copolymer of different diene hydrocarbons with each other, a copolymer of diene hydrocarbons and alkenyl aromatic hydrocarbons showing random distribution of the monomers, a copolymer of diene hydrocarbons and alkenyl aromatic hydrocarbons showing a block structure wherein the transitions between the individual blocks may be sudden or gradual.

The preferred diene hydrocarbons are butadiene and isoprene and preferred alkenyl aromatic hydrocarbons are styrene, α-methylstyrene and vinyl toluene. The diene polymer B should contain at least 30 percent and preferably more than 50 percent, by weight, of diene hydrocarbon. The molecular weight of segment B should be from 20,000 to 1,000,000 and preferably from 50,000 to 500,000.

The polyalkylene oxide A is preferably polyethylene oxide. The molecular weight of segment A should be from 3,000 to 500,000 and preferably from 10,000 to 300,000. The block copolymers preferably contain from 15 to 70 percent and in particular from 25 to 50 percent, by weight, of polyalkylene oxide A. The block copolymers are rubbery substances having a glass temperature which is preferably below 30° C.

The block copolymers are prepared in two stages. The middle block B is first made by homopolymerization of diene hydrocarbons or copolymerization thereof with alkenyl aromatic hydrocarbons, the initiators used being bifunctional organoalkaline metal compounds, preferably potassium compounds. Alkylene oxides are then added to the living chain ends of block B to form blocks A.

Incorporation of the block copolymers into the polyoxymethylenes may be carried out in the usual manner using mixing rolls or an extruder, e.g. a twin-worm extruder. Incorporation is suitably carried out at temperatures of from 170° to 240° C and preferably from 180° to 220° C. Since it is essential for the rubber phase to be very evenly distributed in the polyoxymethylene to achieve the effects of the invention, it is preferred to use highly efficient mixers, if necessary kneader type double screw machines. Preferably, the rubber is fed to the mixer in the form of fine lumps together with polyoxymethylene powder or granules. Blending with 10% to 15% solutions of the three-block copolymer in toluene, evaporation of the solvent and convertion to granules also provides satisfactory results.

The molding compositions of the invention are advantageously protected against degradation by the addition of antioxidants and thermal stabilizers as conventionally used with polyoxymethylenes. In addition, light stabilizers, dyes, fillers, pigments or glass fibers may be incorporated in the molding composition.

Preparation of a block copolymer of diene polymer and polyethylene oxide 2,000 ml of tetrahydrofuran are placed in a three-necked 5-1 vessel and 260 g of butadiene, purified by distillation over butyl lithium, are distilled into the vessel. Polymerization is initiated at 0° C by the addition of 40 ml of a 0.5% M solution of $\alpha$-methyl styrene dipotassium in tetrahydrofuran. A strongly exothermic reaction commences immediately and the temperature rises to about 50 ° C. Polymerization is complete within a few minutes. Analysis of a sample shows that the polybutadiene formed has a molecular weight of 33,000.

To this solution there are added 355 g of liquid ethylene oxide which has been purified by distillation over butyl lithium. The temperature is maintained at about 30° C by cooling with cold water. The reaction is complete after 3 hours.

The living chain ends are stopped by the addition of a few drops of glacial acetic acid. The resulting block copolymer cannot be precipitated by pouring the solution into water, methanol or petroleum ether. Instead, it must be isolated by distilling off the solvent.

The reaction product contains less than 10 percent of homopolyethylene oxide. The total molecular weight is 77,000, which means that each of the two polyethylene oxide blocks has a calculated molecular weight of 22,000. Infrared analysis shows that 64% of the butadiene units of the polybutadiene block have 1,2-vinyl configuration.

EXAMPLE 1

97 parts by weight of an oxymethylene polymer which has been prepared by cationically initiated polymerization of 97 percent w/w of trioxane with 3 percent w/w of 1,3-dioxolane are mixed in a twin-worm extruder at 200° C with 3 parts by weight of a butadiene/ethylene oxide three-block copolymer having a molecular weight of about 200,000 and an ethylene oxide content of 35 percent w/w, and 0.4 percent w/w, based on the oxymethylene copolymer, of a condensate of isophthalic diamide, ethylene urea and formaldehyde and with 0.5 percent w/w of 2,2'-methylene-bis-(4-methyl-6-t.-butylphenol) and the mixture is converted to granules.

The product, which showed virtually no discoloration, showed after heating for 2 hours at 222° C under nitrogen, a weight loss of 0.34 percent w/w of its weight before such treatment (the sample weighed about 1 kg). The result of this test is designated below as WL-$N_2$.

The material was tested in the same way in air. In this case, the granules showed a weight loss of 2.52 percent w/w of their original weight. The result of this test is designated below as WL-A.

The oxymethylene copolymer produced in the form of granules in the same manner but without the three-block copolymer had the following stability values: WL-$N_2$ = 0.39 percent w/w; WL-A = 2.80 percent w/w.

The impact resistance of the molding compositions is determined in a dart drop test on injection molded round disks (plastics temperature 200° C, mold temperature 110° C) having a diameter of 60 mm and a thickness of 1 mm, in the following manner: A horizontal steel plate (thickness 10 mm) is provided with a hole having a diameter of 30 mm and with guide edges on its upper side such that a round disk having a diameter of 60 mm can be fixed in position centrally over the hole. A dart having a semi-spherical tip of 10 mm radius is guided in a rig in such a manner that it can fall freely from a height of 100 mm onto the center of the round disk. By varying the weight of the dart, it is possible to determine different impact resistances. In the following examples, the impact energies (cm · kg) are given at which 5 out of 10 round disks are fractured.

In this test, the said molding composition showed an impact resistance of 4.83 cm · kg, whilst the oxymethylene copolymer prepared without the addition of the rubber had an impact resistance of 1.0 cm · kg.

EXAMPLE 2

Example 1 was repeated except that 90 parts by weight of the trioxane/dioxolane copolymer and 10 parts by weight of the three-block copolymer were used. The molding composition, which showed only very slight cream discoloration, had the following stability values: WL-$N_2$ 0.50 percent w/w; WL-A 4.05 percent w/w. Impact resistance 28.3 cm · kg.

EXAMPLE 3

In the manner described in Example 1, 95 parts by weight of a commercial polyoxymethylene were mixed and formed into granules with 5 parts by weight of the butadiene/ethylene oxide three-block copolymer used in Example 1. The molding composition showed only slight yellow discoloration and had the following stability values: WL-$N_2$ 0.3 percent w/w; WL-A 1.8 percent w/w, the impact resistance being 12.0 cm · kg.

Polyoxymethylene was extruded alone for the purposes of comparison and had the following data: WL-$N_2$ 0.28 percent w/w; WL-A 1.4 percent w/w; impact resistance 1.2 cm · kg.

EXAMPLE 4

Example 3 was repeated except that in place of the butadiene/ethylene oxide three-block copolymer used in Example 1, 10 parts by weight of a structurally similar block copolymer having an ethylene oxide content of 65 percent w/w and a molecular weight of about 200,000 was used.

The resulting molding composition showing virtually no discoloration had the following stability values:
WL-$N_2$ 0.25 percent w/w; WL-A 1.67 percent w/w.
The impact resistance was found to be 12.3 cm · kg.
We claim:

1. Impact-resistant thermoplastic molding compositions comprising a blend of from 70 to 98 percent by weight of a polyoxymethylene and from 30 to 2 percent by weight of a block copolymer of the formula A—B—A, wherein A is a polyethylene oxide block and B is a diene polymer block, said diene polymer block being a homopolymer of butadiene, a copolymer of butadiene and isoprene, a copolymer of butadiene and styrene showing random distribution of the monomers, or a copolymer of butadiene and styrene showing a block structure, said diene polymer B containing at least 30 percent by weight of diene hydrocarbon, said block B having a molecular weight of from 20,000 to 1,000,000.

2. A composition as set forth in claim 1 wherein said block B has a molecular weight of from 50,000 to 500,000 and said blocks A have a molecular weight of from 10,000 to 300,000.

* * * * *